United States Patent
Van Woudenberg et al.

(10) Patent No.: US 6,904,011 B2
(45) Date of Patent: Jun. 7, 2005

(54) MULTILAYER RECORD CARRIER WITH SHIFTED RECORDING START AND STOP POSITIONS

(75) Inventors: Roel Van Woudenberg, Eindhoven (NL); Harm Albert Wierenga, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 421 days.

(21) Appl. No.: 10/101,309

(22) Filed: Mar. 19, 2002

(65) Prior Publication Data

US 2002/0186637 A1 Dec. 12, 2002

(30) Foreign Application Priority Data

Mar. 19, 2001 (EP) .............................................. 01201019

(51) Int. Cl.[7] ................................................. G11B 5/76
(52) U.S. Cl. ................. 369/59.25; 369/94; 369/124.07; 369/275.3
(58) Field of Search ............................ 369/30.1, 30.25, 369/53.29, 59.25, 94, 100, 124.02, 124.07, 275.3, 283, 284

(56) References Cited

U.S. PATENT DOCUMENTS 5,771,386 A     6/1998   Baumbauer
6,728,197 B1 * 4/2004   Miyamoto et al. ....... 369/275.4

OTHER PUBLICATIONS

T. Narahara et al., Optical Disc System for Digital Video Recording, Jpn. J. Application Phys. vol. 39, Part 1, No. 2B, Feb. 2000, pp. 912–919.
K. Schep et a., "Format Description and Evaluation of the 22.5 GB DVR Disc", Techn. Digest ISOM 2000, Sep. 2000.

* cited by examiner

Primary Examiner—Paul W. Huber
(74) Attorney, Agent, or Firm—Edward W. Goodman

(57) ABSTRACT

The present invention relates to a multilayer record carrier, to a recording apparatus and to a method of recording on such a multilayer record carrier, and to a manufacturing method, wherein start and stop positions of recording areas at header portions (H) are shifted in a lower recording layer (8) by a predetermined distance (Δ) such that recording and reading in/from the lower layer (8) is not affected by a variation in the transmittivity of the upper layer (6) at the transitions between the recording areas (R) and the header portions. The shifting may be obtained by extending gap portions or adding mirror areas to the header portions (H).

14 Claims, 2 Drawing Sheets

MULTILAYER RECORD CARRIER WITH SHIFTED RECORDING START AND STOP POSITIONS

Figure 1:
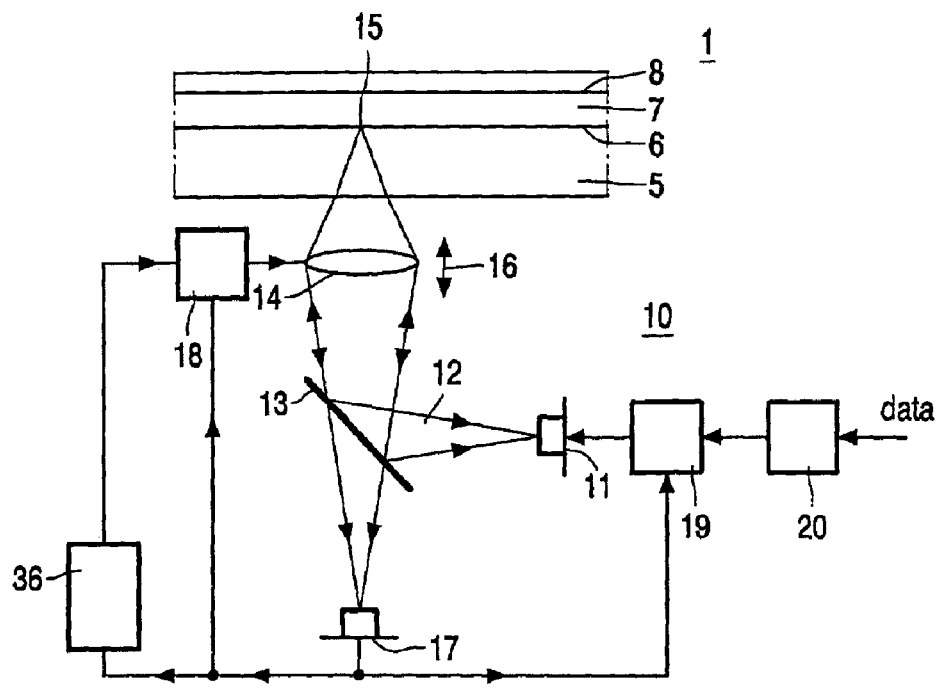

The present invention relates to a multilayer record carrier comprising at least two substantially parallel and substantially aligned information layers suitable to be recorded by irradiation by a radiation beam. An example of such a record carrier is a recordable optical disk. The present invention also relates to the manufacture of such a multilayer record carrier.

The present invention also relates to a recording apparatus and a method for recording on such a multilayer record carrier.

Optical data storage systems, such as optical disk drives, allow storage of large quantities of data on an optical record carrier. The data is accessed by focussing a radiation beam (for example a laser beam) onto the recording layer of the record carrier and then detecting the reflected light beam. In reversible or rewritable phase-change systems, optical record carriers with two stable phases are used. A data bit is stored on the media by converting a small local area to one stable phase. The data bit can be erased by reverting the written area back to the starting phase. The starting phase is typically a crystalline phase and the laser beam writes data by locally converting the material in the data layer to a stable amorphous phase. This can be achieved by heating the crystalline region above its melting point and then cooling it quickly so that the disordered structure becomes fixed in place, resulting in an amorphous structure. The data bit can later be erased by converting the amorphous phase back to the starting crystalline phase. This is done when the amorphous region is heated and maintained at or above its crystallisation temperature, or alternatively melted and slowly cooled until the region is crystallised. The data recorded on this type of phase change record carriers is read by detecting changes in reflectivity between a crystalline region and an amorphous region on the record carrier.

To increase the storage capacity of an optical disk, multiple recording layer disks have been proposed. An optical disk having two or more recording layers may be accessed at different spatially separated recording layers by changing the focal position of a lens. The laser beam is transmitted through the nearer or upper recording layer to read and write data on the farthest or lower recording layer or layers. For multiple recording layer disks it is necessary that the intermediate recording layers between the disk surface onto which the laser light is incident and the last or farthermost recording layer from that surface are light-transmissive.

In (rewritable) optical recording with random access the data is usually written in units of ECC blocks (e.g. in CLV systems without headers), in fixed recording unit blocks of a fixed fraction of an ECC block, such as for example 2 kbyte or 4 kbyte of user data (e.g. in Zoned Constant Angular Velocity or ZCAV systems with headers where the distance between two headers is an integer multiple of these recording unit blocks), or in variable length fractions of an ECC block (e.g. in Digital Video Recording systems where the ECC block size is not an integer multiple of the distance between two headers and writing is "simply" stopped before a header and restarted after a header with the inclusion of some segment run-in and segment run-out data to guarantee proper behaviour of the electronics). Such fractions of ECC blocks are called "Recording Frames" in DVR systems and "SYNC Frames" in DVD systems. In optical record carriers with headers, the record carrier is subdivided in sectors, each sector comprising a header containing an address uniquely identifying the sector and a recording unit block in which user data, preferably protected by an error detection and correction code (ECC), is recorded.

In DVR systems a ZCAV system is used. In such systems the capacity of a sector is not constant across the disk. The linear density is approximately constant and the number of tracks per zone is constant, but the length of a track increases with a factor of 2.4 from the inner to the outer radius of the disc, while the number of headers per revolution is constant. Thus, the number of bits between two headers increases. The DVR system and format are described in T. Narahara et al., "Optical Disc system for Digital Video Recording", Techn. Digest ISOM/ODS (MD 1) Jul. 11–15, 1999, Kauai Hawaii, SPIE Vol. 3864 (1999), 50–52, and Jpn. J. Appl. Phys. 39 Pt. 1 No. 2B (2000), 912–919, and in Schep et al. "Format description and evaluation of the 22.5 GB DVR disc", Techn. Digest ISOM 2000 (September 2000).

When data is written in such systems, gaps are provided at the header areas. Just after (segment run-in) and before (segment run-out) the header area, the groove is not yet written with phase change data. In the DVR system, this segment run-in starts with a gap before the data is actually written and this segment run-out ends with a gap just before the header. In DVR systems the gaps may have a length of typically about 150 $\mu$m while the diameter of the beam in the upper layer is about 40 $\mu$m when writing on the lower layer. Thus, gaps in upper layers interfere with the writing on a lower layer. The influence of the gaps increases when the gaps are at the same angular position in neighbouring tracks, e.g. in CLV or ZCAV systems when an integer number of ECC blocks fits almost exactly on one or an integer number of circumferences.

The difference in the transmittivity or transmission between the header areas and (crystalline) non-written groove regions or gaps is in general only marginal due to the fact that the refractive indices of the cover layer (or substrate) on one side of the upper layer and the spacer on the other side is only small (typically less than or equal to 0.1; e.g. cover with n=1.6 and spacer with n=1.5). However, a more important issue is the difference between written and non-written areas, where the header areas cause a problem. The header areas behave as gaps with respect to their transmittivity. Hence, they constitute a problem due to their frequent appearance, for example eight times per circumference in DVR systems and even more frequently in DVD-RAM systems with headers.

The header areas and gaps have a reduced transmittivity as compared to the written recording sections. Due to the random orientation of the upper information layer, the header areas of the upper information layer may be located above a recording or writing sector of the lower information layer, such that the transmission property of the upper information layer differs within the header areas and gaps. Furthermore, displacements of the upper information layer with respect to a lower information layer may result from unroundness, eccentricity (decentering of the center of the spiral track with respect to the central hole) and angular differences. Such decentering of the spiral track with respect to the central hole is introduced mainly in the moulding step of the disk mastering and replication process.

In dual or multilayer systems, the lower layer is written or recorded while a significant area of the laser beam passes through the gaps or header areas of the upper layer or layers. Thus, when information or data has been recorded on the upper information layer, the transmission properties or transmission characteristics of the upper layer differ in dependence on whether or not the laser beam passes through written areas, gaps, or header areas.

In K. Kurokawa et al, Techn. Digest ISOM/ODS'99 (SPIE Vol. 3864), 197–199, a dual layer disk is proposed which has the following parameters for the upper layer:

| | |
|---|---|
| Transmittivity in the non-written state: | T(non-written) = 45% |
| Transmittivity in the written state: | T(written) = 55% |

Thus, the transmittivity or transmission T of the non-written state is lower than that of the written state. When writing on the lower information layer, passing through a non-written area (for example, a gap or header portion) on the upper information layer requires a higher incident power $P_{inc}$ on the disk than passing through a written area to achieve the same recording power $P_{rec}$ on the lower information layer. This is expressed by the following equation:

$$P_{rec}=P_{inc} \cdot T(\text{upper layer})$$

For example, when an incident power of $P_{inc}$=14 mW is required during recording through a written upper layer, the incident power during recording through a non-written upper layer amounts to $P_{inc}$=17.1 mW as is derived from the above formula using the parameter values found by Kurokawa et al.:

$$P_{rec}=P_{inc,written} \cdot T(\text{written})=P_{inc,non\text{-}written} \cdot T(\text{non-written}),$$

$$P_{inc,non\text{-}written}=P_{inc,written} \cdot T(\text{written})/T(\text{non-written})=14 \text{ mW} \cdot (0.55/0.45), P_{inc,non\text{-}written}=17.1 \text{ mW}.$$

In the above example, the recording power required when recording through a written upper layer amounts to only 82% of the recording power required for recording through a non-written upper layer. Thus, the use of a recording power of 14 mW would result in an under-power of 18% when recording through a non-written area while a recording power of 17.1 mW would result in an over-power of 18% when recording through a written area. However, this is in general not within the allowed power margin specified for optical recording systems. Typically this allowed power margin is in the range from −10% to +15%. Higher margins would require high bandwidth power control in the drive unit of the laser diode to correct for the differences in transmittivity when writing underneath unwritten or header portions.

It is, therefore, preferred to provide a tangential or angular alignment between the header portions, such that the header portions and linking gaps of an upper layer do not influence writing to and reading from a lower layer. Nevertheless, even in case of such an alignment, a non-uniform transmittivity is still obtained at certain positions during the recording on or reading from the lower information layer. This is explained with reference to FIG. 4.

Figure 4A:
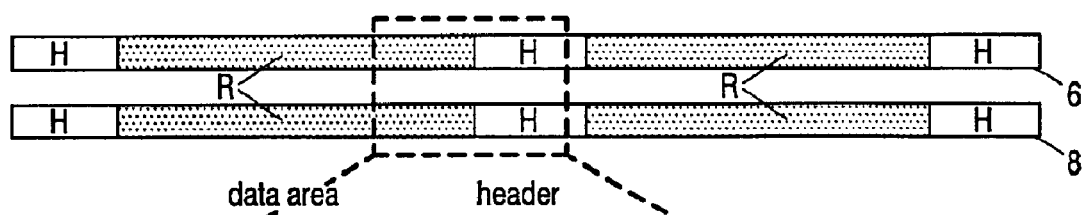
Figure 4B:
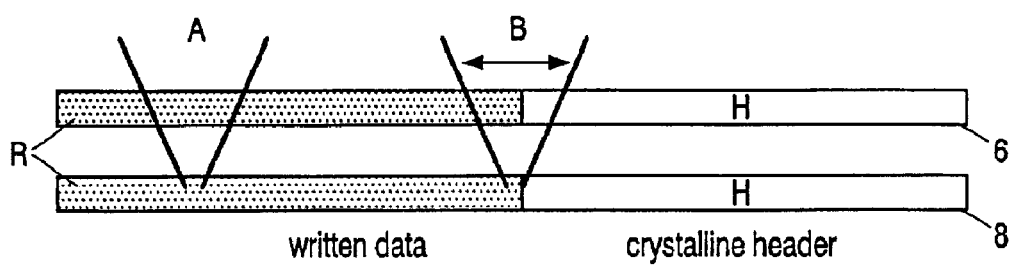

FIG. 4 shows a cross section of a dual layer disk structure along a recording or reading track. FIG. 4B is an enlarged view of an area indicated by the dashed rectangle in FIG. 4A. The dual layer structure comprises an upper information layer 6 and a lower information layer 8 which both contain header portions H and recording sectors R. As can be gathered from FIG. 4A, the upper and lower informations layers 6, 8 are aligned or substantially aligned in the angular or tangential direction. That is, corresponding ones of the header portions H are arranged at the same angular or tangential positions in the upper information layer 6 and in the lower information layer 8. In practice, such an alignment is possible within about ±10 μm, e.g. by optical alignment in the joining step of disk manufacturing.

In FIG. 4B, a laser beam focused on the lower information layer 8 is indicated at two angular positions A and B. Furthermore, a beam diameter BD as obtained in the upper information layer 6 is indicated. At the angular position A, the beam diameter BD in the upper information layer 6 covers a uniformly recorded or written area with a uniform transmittivity. However, at the angular position B, the area covered by the beam diameter comprises a written portion and a header portion (in particular a gap portion which is usually provided at the beginning of each header portion H). Thus, the transmittivity is not uniform in the covered area, such that an incorrect laser power is used for reading or writing at the angular position B.

It is an object of the present invention to provide a multilayer record carrier, a method of manufacturing such a record carrier, and a method and an apparatus for recording on such a multilayer record carrier by means of which the residual effects of the differences in the transmission properties on the recording or reading operation can be reduced.

This object is achieved by a record carrier as claimed in the claims 1 and 5, by a manufacturing method as claimed in claim 11, by a recording method as claimed in claim 7, and by a recording apparatus as claimed in claim 13.

Accordingly, the start and stop positions for the recording or writing after and before the header portions are shifted such that the transition between the header portions and the written portions in the upper layer do not affect writing and reading in/from the lower layer. The shifting may be achieved by corresponding control during the recording operation, such that enlarged gap portions are provided at the header portions in the lower layer. As an alternative, the header portions may be enlarged in the lower layer, for example during the disk manufacture; this also results in a shift of the start and stop positions for the recording sectors. The enlargement of the header portions may be obtained by providing an additional mirror area or dummy pit structure in the header portions.

Due to the enlarged header or gap portions in the lower layer, the area of the upper layer that is covered by the laser beam when focused on the start and stop positions of the lower layer can be shifted to an area with a uniform transmittivity, such that the correct laser power is used throughout the recording sectors.

In an embodiment of the method and apparatus according to the invention, a gap portion that is arranged between said start position and the end of said header portion (H) and between said stop position and the beginning of said header portion (H) in the upper layer is also extended by said predetermined distance, such that a corresponding gap portion in the lower layer is extended by two times said predetermined distance due to the additional shift during the recording on the lower information layer. Header reading is thus also protected from variable reading powers. When the gap lengths in the upper information layer are additionally extended with the same distances as the relative shift in the lower information layer, both data writing and reading in the lower layer is not affected by the presence of a header portion. The header reading in the lower layer is not affected by the state of the upper layer, since it is always read through a non-written area.

Preferably, the predetermined distance may be set to be greater than or equal to approximately the sum of half the diameter of said radiation beam in the upper layer when focussed on the lower layer and a maximum allowed misalignment between the upper layer and the lower layer. Thus, even in case the information layers are misaligned according to the maximum allowed misalignment it is still assured that the correct reading or writing power is used, since the beam diameter of the laser beam in the upper layer covers an area with a uniform transmittivity during the whole recording or reading operation of the lower layer. The predetermined distance may be selected to correspond to a length of a half or one full recording frame, that is, three or six wobble periods in the DVR format. This allows a maximum misalignment of about 60 μm which is a feasible value for a manufacturing process. Moreover, the choice of three or six wobble periods fits well into the DVR format which is based on six wobble units (one Recording Frame length). This means that the channel electronics do not have to be modified when switching between the upper layer and the lower layer. Only the start and stop positions have to be adjusted relative to the end and the beginning of the header portions.

Figure 2:
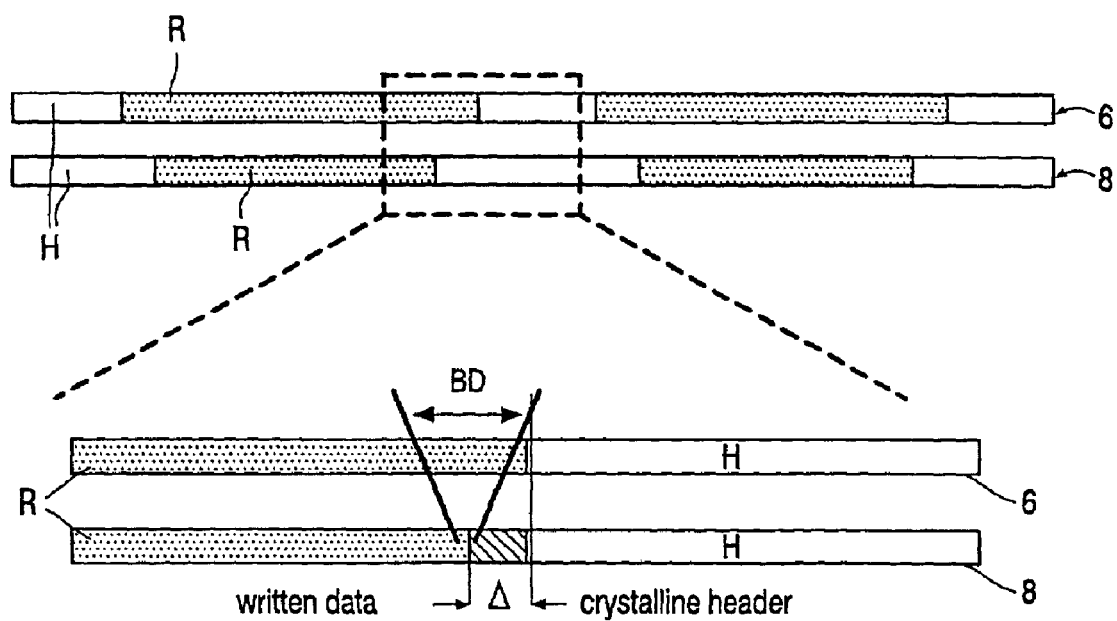
Figure 3:
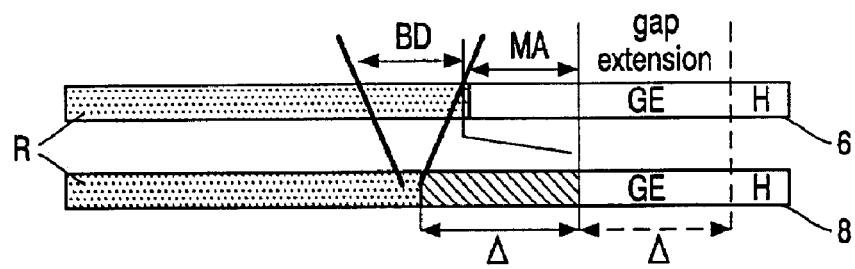

The present invention will be described in greater detail hereinafter on the basis of a preferred embodiment of the invention and with reference to the accompanying drawings, in which:

FIG. 1 is a cross-sectional view of a dual layer record carrier and a block diagram of a recording unit according to a preferred embodiment, FIG. 2 is a cross-sectional view of a dual layer record carrier according to a preferred embodiment showing its layer structure, FIG. 3 is a cross-sectional view of a dual layer record carrier with a misalignment of the layers and an optional additional gap extension in the upper layer according to a preferred embodiment, and FIGS. 4A and 4B are cross-sectional views of the layer structure in a dual layer optical disk.

A preferred embodiment will now be described on the basis of a dual layer optical disk system, the format of the dual layer disk being based on the single layer disk format as described in T. Narahara et al in "Optical Disc system for Digital Video Recording", Techn. Digest ISOM/ODS (MD1) Jul. 11–15, 1999, Kauai Hawaii, SPIE Vol. 3864 (1999), pp. 50–52, and in Jpn. J. Appl. Phys. 39 Pt. 1 No. 2B (2000), pp. 912–919

FIG. 1 shows a cross-section of a dual layer record carrier 1 and a recording unit 10 for performing a scanning operation so as to write information or data into the record carrier 1. The record carrier 1 has a transparent substrate 5 provided with a first information layer 6 and a second information layer 8 arranged substantially parallel and aligned thereto and separated by a transparent spacer layer 7. Although only two information layers are shown in this embodiment of the record carrier 1, the number of information layers may be more than two. The recording unit 10 comprises a radiation source 11, for example a diode laser, which generates a radiation beam 12 with a predetermined recording or writing power. The radiation beam is formed to a focussing spot 15 via a beam splitter 13, for example a semi-transparent plate, and a lens system 14, for example an objective lens. The focussing spot 15 can be placed on any desired information layer 6,8 by moving the objective lens 14 along its optical axis, as is denoted by the arrow 16. Since the first information layer 6 is partially transmissive, the radiation beam can be focussed through this layer on the second information layer 8. By rotating the record carrier 1 about its center and by displacing the focus sing spot in a direction perpendicular to the tracks in the plane of the information layer, the entire information area of an information layer can be scanned by the focussing spot during a writing or reading operation. The radiation reflected by an information layer is modulated by the stored information into, for example, intensity or direction of polarization. The reflected radiation is guided by the objective lens 14 and the beam splitter 13 towards a detection system 17 which converts the incident radiation into one or more electrical signals. One of the signals, the information signal, has a modulation which is related to the modulation of the reflected radiation, so that this signal represents the information which has been read. Other electrical signals indicate the position of the focussing spot 15 with respect to the track to be read and the position (that is, the angular and the radial position) of the focussing spot 15 on the record carrier. The latter signals are applied to a servo system 18 which controls the position of the objective lens 14 and hence the position of the focussing spot 15 in the plane of the information layers and perpendicular thereto in such a way that the focussing spot 15 follows the desired track in the plane of an information layer to be scanned. A control unit 36 is provided which controls the servo system 18 on the basis of a level of the reflected light signal detected by the detection system 17. The control of the writing power may be performed by feedback from the detection system 17, via a driving unit 19, to the radiation source 11. Furthermore, a recording control unit 20 operates in accordance with a control program which controls the recording unit 10 so as to achieve a proper recording on the information layers 6, 8 on the basis of a data input. In particular, a writing power calibration procedure, such as an initial OPC procedure for setting an initial optimum value for the writing power, and a writing power correction procedure, such as a running-OPC procedure for correcting power losses due to, for example fingerprints and scratches on the disk surface, may be provided. The recording is controlled by the recording control unit 20 using, for example a wobble counter (not shown) to derive the recording position from a wobble signal provided on the record carrier 1.

It is to be noted that the invention is also applicable to other disk structures, for example a structure where the substrate serves as a rigid carrier carrying embossed information while readout is performed through a thin cover layer. Furthermore, a two-lens objective may be used instead of the single objective lens 14 as shown in FIG. 1.

FIG. 2 shows a cross section of the dual-layer structure of the optical disk 1 as seen along a track. Like in FIG. 4, a transition section indicated by the dashed rectangle is shown enlarged in the lower part of FIG. 2. In such a record carrier of the phase-change type (that is, a record carrier where amorphous marks are recorded in crystalline surroundings) pre-recorded header areas H comprising embossed pits constitute a significant part of the non-written portion of the record carrier. A mirror mark at the start of the header area H can be used for offset control and correction of servo signals. In particular, a part of the groove portions located just before and after the header area H is not written. These portions are called segment lead-in or run-in areas and segment lead-out or run-out areas, respectively.

The start and stop positions for recording to or reading from recording sectors R of the upper and lower layers 6, 8 are derived by the recording control unit 20 from the wobble counter. In the segment run-in and the segment run-out of the header area H, the groove is not written with phase change data. In the DVR system, the segment run-in (or out) starts (or ends) with a gap portion before data is actually written. This gap is used, for example, for the random start position shift (in segment run-in) which is used for increasing the number of overwrite cycles in the record carrier 1, and as a reserved space (in segment run-out) if, for example, the bit length used is slightly longer than the nominal length due to, for example, inaccuracies occurring when the recording control unit 20 derives the write clock from the wobble signal or when writing is performed using a non-locked crystal clock. After (or before) these gap portions, a guard is written in the header area H; this overwrites the synchronization patterns from previous recordings and allows the electronics to settle.

As can be gathered from FIG. 2, the start and the stop position for recording or writing at the header areas H in the lower layer 8 are shifted with respect to the upper layer 6 by a predetermined distance Δ. Consequently, the area through which the beam passes in the first layer is of a uniform transmittivity within the beam diameter BD when focussing on the lower layer 8. This can be achieved by increasing the length of the gap portions in the lower layer 8 as indicated by the hatched portion in the lower layer 8.

FIG. 3 shows a similar cross section where a maximum allowed angular or tangential misalignment MA between the lower layer 8 and the upper layer 6 is indicated so as to be considered in the determination of the predetermined distance Δ. When this maximum allowed misalignment is considered, the minimum length (MG) of the gap portions at the header areas H in the lower layer 8 is greater than or equal to the sum of: 1) half the diameter BD of the beam in the upper layer 6 when focussed on the lower layer 8 (or the deepest layer in case of a structure with more than two layers), and 2) the maximum allowed misalignment between the two layers (Peak-peak alignment tolerance T(PP)). This can be expressed by the following equations:

$$MG \geq BD/2 + T(PP)$$

$$BD = 2 \cdot SP \cdot \tan(\mathrm{asin}(NA/n)),$$

wherein NA denotes the numerical aperture of the laser beam and SP denotes the thickness of the spacer layer 7.

In a DVR-blue system, utilizing a blue laser light and a numerical aperture of NA=0.85, the diameter of the beam in the upper layer 6 when focussed on the deepest layer is approximately BD=40 μm when a spacer thickness SP of 30 μm is used. This necessitates a delay of the start position in the lower layer 8 by BD/2=20 μm compared to the start position in the upper layer (and a stop earlier at the same distance) when the two layers would be perfectly aligned (T(PP)=0). With a channel bit length of 86.7 nm and a wobble period of 322 channel bits, this corresponds to a distance of approx. 0.7 wobble period. When a distance amounting to 3 wobble periods is selected (i.e. additional gap length), this leaves a peak-peak alignment tolerance between the two layers 6, 8 of T(PP)=60 μm, which is a feasible value for a manufacturing process. Moreover, the choice of using 3 wobbles in segment run-in and 3 wobbles in segment run-out fits well in the DVR-format, since that is based on 6 wobble units or periods (the Recording Frame length). This implies that the channel electronics of the recording control unit 20 do not have to be modified when switching from one layer to the other. Only the start and stop positions have to be adjusted relative to the end and the beginning of a header area H. As an alternative, a 6 wobble distance could be selected. In general, the predetermined distance Δ can be selected to correspond to one or a half of the recording frame length of the record carrier format used.

Alternatively, instead of extending the gap length one may also extend the header areas H in the lower layer 8, for example, with an additional (mirror) area as indicated above. In the latter case, the physical groove structure starts/ends later by the same distances as given above. As still another option, the header areas H can be extended by a dummy pit structure or sequence, for example a VFO sequence (as the one used in the header) or another dummy data sequence such as, for example, random data or an alternative regular pattern. This can be beneficial for the channel electronics, since it can help to adjust the automatic gain control, AC-coupling and PLL (slicer) circuitry to the right value when changing from a phase change part (recording sector R) to a header area H. Furthermore, it can be beneficial for the tracking servo system, since it provides an error signal (control signal) for radial tracking which is not available from the mirror area. In these cases the hatched portion shown in the lower layer 8 of FIG. 2 and of FIG. 3 is part of the subsequent header area H. This extension of the header areas H of the lower layer 8 can be obtained by forming corresponding header areas during the manufacturing process of the record carrier 1. In the solutions presented above, the reading of the (embossed) header areas H is not yet protected against the use of an incorrect reading power due to a non-uniform transmittivity of the upper layer 8. When reading a header in the lower layer, the detected HF signal might show a level variation due to reading through the end or start of the written tracks in the recording sectors R at the header areas H of the upper layer 6. This does not cause problems when the bandwidth of the AGC (Automatic Gain Control) of the driving unit 19 and the slicer control for the header PLL in the recording section 10 are chosen to be sufficiently high. However, preferably one could choose to protect the header reading from this level change by extending the gap lengths in the upper layer 6 with the same distances Δ as above, and at the same time extending the gap lengths in the lower layer by another distance Δ such that a total shift of two times the distance Δ is obtained in the lower layer 8. This optional shifting is also controlled or initiated by the recording control unit 20 and indicated by the dashed arrow and the gap extensions GE in FIG. 3.

In a DVR system, the preferred choices would then be to use a gap length extension GE of 3 wobbles in the upper layer 6 and a total gap length extension of 3+3=6 wobbles in the lower layer 8. With these choices, data writing (and reading) in the lower layer 8 is not affected by the presence of a header area H and the corresponding transmission differences due to written/unwritten transition in the upper layer 6 (since the beam passes through a uniform recording state of the upper layer 6), and also the header reading in the lower layer 8 is not affected by the recording state of the upper layer 6 (since it is always read through a non-written area). This additional gap extension may, of course, alternatively be combined with the option of increasing the header areas H in the lower layer 8 during the disk manufacturing wherein the gap extension is equal in the upper and lower layers 6, 8.

It is to be noted that the present invention is not restricted to the above preferred embodiments but can be used in any recording method for recording on a multilayer record carrier where the recording operation on one of the information layers is influenced by differences in a transmission property of the other information layer or layers. In particular, there are numerous alternatives for the optical design of information layers. Usually, information layers are made which have a high initial reflection and a lower reflection in the written state. However, it is also possible to use information layers with the opposite contrast, i.e. so-called "white-writing" layers. Similarly, due to an alternative information layer design, the transmittivity of the written state may be lower than that of the non-written state. Thus, the preferred embodiment may vary within the scope of the attached claims. Furthermore, the word "comprise"

and its conjugations do not exclude the presence of steps or elements other than those listed in the claims. In the claims, any reference sign placed between parentheses shall not be construed as limiting the claims.

What is claimed is:

1. A multilayer record carrier comprising at least two substantially parallel and substantially aligned information layers (6, 8) suitable to be recorded by irradiation by a radiation beam, said multilayer record carrier comprising predetermined recording segments (R) arranged in said at least two information layers (6, 8), said segments being separated by header portions (H) wherein a recording area ends at a predetermined stop position at the beginning of a header portion and starts at a predetermined start position at the end of a header portion, characterized in that in a lower layer (8) said start position and said stop position are shifted with respect to an upper layer (6) to a later position and to an earlier position, respectively, by a predetermined distance (Δ), and in that said predetermined distance (Δ) is selected such that an area through which said radiation beam passes in said upper layer (6) has a uniform transmittivity within the beam diameter (BD) when said radiation beam is focussed on the start or stop positions of said lower layer (8).

2. A record carrier as claimed in claim 1, wherein in said upper layer (6) a gap portion is arranged between said start position and the end of said header portion (H) or between said stop position and the beginning of said header portion (H) and wherein said gap portion is extended by said predetermined distance (Δ) such that a corresponding gap portion in said lower layer (8) is extended by two times said predetermined distance (Δ).

3. A record carrier as claimed in claim 1, wherein said predetermined distance (Δ) is set to be greater than or equal to approximately the sum of half the diameter of said radiation beam in said upper layer (6) when focussed on said lower layer (8) and of a maximum allowed misalignment (MA) between said upper layer (6) and said lower layer (8).

4. A record carrier as claimed in claim 1, wherein said predetermined distance (Δ) corresponds to one or to a half of a recording frame.

5. A multilayer record carrier comprising at least two substantially parallel and substantially aligned information layers (6, 8) suitable to be recorded by irradiation by a radiation beam, said multilayer record carrier comprising predetermined recording segments (R) arranged in said at least two information layers (6, 8), said segments being separated by header portions (H) wherein a recording area ends at a predetermined stop position at the beginning of a header portion and starts at a predetermined start position at the end of a header portion, characterized in that in a lower layer (8) said beginning and said end of said header portions are shifted with respect to said upper layer (6) by a predetermined distance (Δ) to an earlier position and to a later position, respectively, and in that said predetermined distance is selected such that an area through which said radiation beam passes in said upper layer (6) has a uniform transmittivity within the beam diameter (BD) when said radiation beam is focussed on the start or stop positions of said lower layer (8).

6. A record carrier as claimed in claim 5, wherein said shifting of the beginning and of the end of said header portions (H) is obtained by providing a mirror area or by providing a dummy pit structure in said header portions.

7. A method of recording information on a multilayer record carrier (1) by irradiating the record carrier by a radiation beam, said multilayer record carrier comprising at least two substantially parallel and substantially aligned information layers (6, 8), said method comprising a step of recording said information in predetermined segments (R) of said at least two information layers (6, 8), said segments being separated by header portions (H), and stopping said recording of said information at a predetermined stop position at the beginning of said header portions and starting said recording at a predetermined start position at the end of said header portions, characterized in that the method also comprises a step of shifting in said lower layer (8) with respect to said upper layer (6) said start position to a later position and said stop position to an earlier position by a predetermined distance (Δ), and a step of setting said predetermined distance (Δ) such that an area through which said radiation beam passes in said upper layer (6) is of a uniform transmission nature within the beam diameter (BD) when said radiation beam is focussed on the start or stop positions of said lower layer (8).

8. A method as claimed in claim 7, also comprising the step of extending in said upper layer (6) a gap portion arranged between said start position and the end of said header portion or between said stop position and the beginning of said header portion by said predetermined distance (Δ) such that a corresponding gap portion in said lower layer (8) is extended by two times said predetermined distance (Δ).

9. A method as claimed in claim 7, wherein said predetermined distance (Δ) is set to be greater than or equal to approximately the sum of half the diameter of said radiation beam in said upper layer (6) when focussed on said lower layer (8) and of a maximum allowed misalignment (MA) between said upper layer (6) and said lower layer (8).

10. A method as claimed in claim 7, wherein said predetermined distance corresponds to one or to a half of a recording frame.

11. A method of manufacturing a multilayer record carrier (1) comprising at least two substantially parallel and substantially aligned information layers (6, 8), said method comprising the step of forming predetermined header portions (H) in said at least two information layers (6, 8), said header portions being arranged to separate recording segments (R), characterized in that the method also comprises a step of forming said header portions such that in a lower layer (6) of said at least two information layers (6, 8) the ends of said header portions are shifted with respect to an upper layer (6) of said at least two information layers (6, 8) to a later position and the beginnings of said header portions are shifted with respect to an upper layer (6) of said at least two information layers (6, 8) to an earlier position by a predetermined distance (Δ), and the step of setting said predetermined distance (Δ) such that an area through which a radiation beam used for recording or reading said record carrier (1) passes in said upper layer (6) is of a uniform transmission nature within the beam diameter (BD) when said radiation beam is focussed on start or end positions of said recording segments of said lower layer (8).

12. A method as claimed in claim 11, wherein said shifting of the beginning and of the end of said header portions (H) is obtained by providing a mirror area or by providing a dummy pit structure in said header portions.

13. A recording apparatus for recording information on a multilayer record carrier (1), said record carrier comprising at least two substantially parallel and substantially aligned information layers (6, 8), said apparatus comprising a radiation source for providing a radiation beam, recording means (11) for recording said information in predetermined segments (R) of said at least two information layers (6, 8) by irradiating the record carrier (1) by a radiation beam, said segments being separated by header portions (H); and control means (20) for stopping said recording of said information at a predetermined stop position at the beginning of said header portions and starting said recording at a predetermined start position at the end of said header portions, characterized in that said control means (20) are arranged to shift in said lower layer (8) said start position to a later position and said stop position to an earlier position by a predetermined distance ($\Delta$) with respect to said upper layer (6), wherein said predetermined distance ($\Delta$) is set such that an area through which said radiation beam passes in said upper layer (6) is of a uniform transmission nature within the beam diameter (BD) when said radiation beam is focussed on the start and stop positions of said lower layer (8).

14. An apparatus as claimed in claim 13, wherein said control means (20) are arranged to extend in said upper layer (6) a gap portion arranged between said start position and the end of said header portion or between said stop position and the beginning of said header portion by said predetermined distance ($\Delta$), such that a corresponding gap portion in said lower layer (8) is extended by two times said predetermined distance ($\Delta$).

* * * * *